United States Patent [19]

Kohno

[11] Patent Number: 5,042,619
[45] Date of Patent: Aug. 27, 1991

[54] COMMODITY DATA READING APPARATUS

[75] Inventor: Mitunori Kohno, Shizuoka, Japan

[73] Assignee: Tokyo Electric Co., Ltd., Tokyo, Japan

[21] Appl. No.: 407,939

[22] Filed: Sep. 15, 1989

[30] Foreign Application Priority Data

Sep. 21, 1988 [JP] Japan .................. 63-237364

[51] Int. Cl.[5] .............................. G06K 7/01
[52] U.S. Cl. ........................ 186/61; 235/440
[58] Field of Search .............. 186/59, 60, 61; 235/440, 462

[56] References Cited

U.S. PATENT DOCUMENTS

| 4,473,746 | 9/1984 | Edmonds | 235/462 X |
| 4,652,732 | 3/1987 | Nickl | 235/462 |
| 4,882,476 | 11/1989 | White | 235/462 |
| 4,938,317 | 7/1990 | Kohno et al. | 186/59 X |

FOREIGN PATENT DOCUMENTS

| 50-148040 | 11/1975 | Japan . | |
| 52-2445 | 1/1977 | Japan . | |
| 53-26624 | 11/1978 | Japan | 235/462 |
| 59-57366 | 4/1984 | Japan | 235/440 |
| 59-197967 | 11/1984 | Japan . | |
| 60-205773 | 10/1985 | Japan . | |
| 61-163572 | 10/1986 | Japan . | |
| 61-228584 | 10/1986 | Japan . | |
| 63-45666 | 3/1988 | Japan . | |

Primary Examiner—David A. Bucci
Assistant Examiner—Scott L. Lowe
Attorney, Agent, or Firm—Frishauf, Holtz, Goodman & Woodward

[57] ABSTRACT

A commodity data reading apparatus comprises a commodity receiving base having a placing surface. A support post projects upwardly relative to the placing surface of the base. A bar code reader having two laser beam scanners is mounted in the post to arrange the two scanners at two positions on the post, which are vertically spaced from each other.

13 Claims, 7 Drawing Sheets

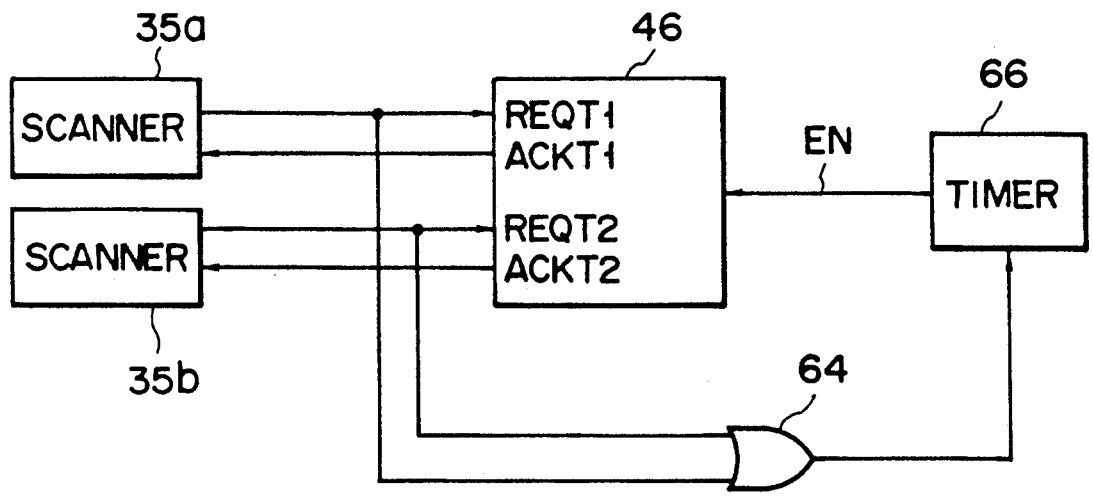
F I G. 7
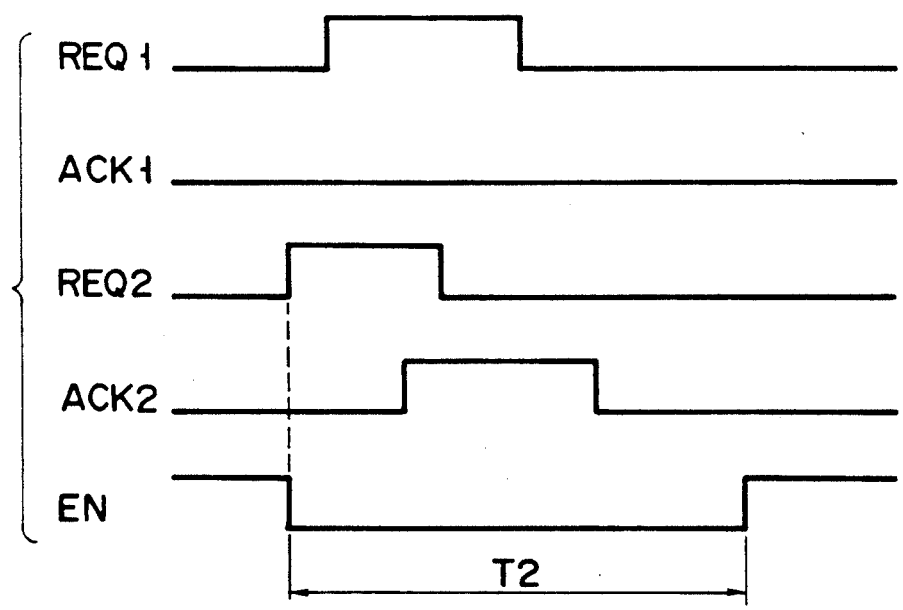
F I G. 8

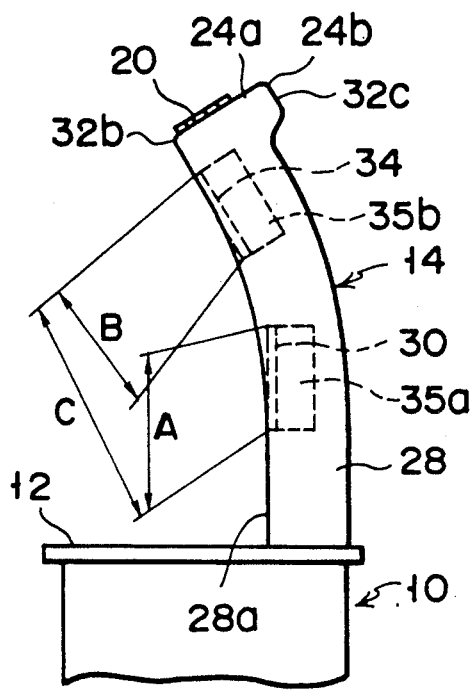
F I G. 11
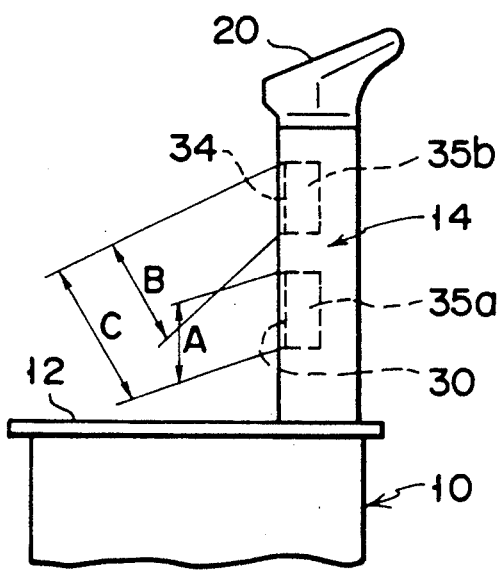
F I G. 12

COMMODITY DATA READING APPARATUS

BACKGROUND OF THE INVENTION

1. Field of the Invention

The present invention relates to a commodity data reading apparatus with a bar code reader which has scanning means supported on a support post fixed to a commodity receiving base to project upwardly relative to a commodity placing surface of the receiving base, the scanning means scanning a bar code mounted on a commodity when the commodity passes over the placing surface.

2. Description of the Related Art

The above described type of the commodity data reading apparatus has been used in a check out system installed in a supermarket, for example.

FIGS. 1 through 3 show a conventional commodity data reading apparatus of the above type, which is used in a supermarket. In this apparatus, a support post 14 projecting vertically upward is mounted at the center of one side edge of the rectangular and horizontal commodity placing surface 12 of a check table 10, and the placing surface 12 is mounted on the top surface of the table 10. A bar code read window 16 is formed in the center portion of one side surface of the post 14, one side surface being located at the placing surface side. A scanner of the bar code reader (not shown) is disposed inside the post 14 to face the window 16.

A stopper 18 in the form of a rubber stripe lies in the right part (as viewed in the drawings of FIGS. 1 and 2) of the placing surface 12 so as to be located at a position near the support post 14 and to extend in a width direction of the placing surface 12. The right part of the placing surface 12 with respect to the stopper 18 in FIGS. 1 and 2 is used as a basket receiving area 12a on which is placed a basket 26a containing commodities that have not had their commodity data inputted. The left part of the placing surface 12 of the table 10 is used as a basket sending-out area 12b on which an empty basket 26b can be placed to receive data-inputted commodities. An empty basket 26b can be placed at a narrow portion 12c in front of the post 14 on the sending-out area 12b of the placing surface 12 in such a wa that its longitudinal edges extend parallel to the longitudinal edges of the surface 12, as is shown in FIG. 2.

A top end surface of the post 14 is inclined toward the placing surface 12, and a keyboard 20, which is an input unit to control means of the bar code reader, is arranged on the inclined top end surface. A display support 22 having a triangular cross section is mounted on the top end portion of the post 14 to extend parallel to the placing surface 12 of the table 10. Display panels 24a and 24b as data display means are disposed on the two inclined regions in the top surface of the display support 22. The display panels 24a and 24b display a specific one of the commodity data, e.g., a total of the prices of purchased commodities, that are read from the bar code on the purchased commodity by means of the bar code reader or that are inputted by the keyboard 20.

In practical use, an operator or cashier 25 stands on one side of the check table 10, which is remote from the support post 14, while a purchaser stands on the other side of the table 10. The purchaser places a basket 26a, in which commodities that he or she wants to purchase, on the basket receiving area 12a of the placing surface 12 of the check table 10.

An operator 25 picks up a commodity from the basket 26a placed on the basket receiving area 12a of the placing surface 12, passes the commodity in front of the bar code read window 16 of the post 14 with a bar code, mounted on the commodity, directed toward the bar code read window 16, and enters the commodity into the empty basket 26b located on the narrow portion 12c of the basket sending-out area 12b.

Since the scanner, which is located within the support post 14 to face the window 16, is scanning a predetermined range in a space indicated by a one-dot chain line in FIG. 3, with a laser beam, the operator 25 holding the commodity must pass the bar code on the commodity within the predetermined range. Further, the bar code displaying area on the outer surface of the commodity must be crossed by the laser beam applied in the predetermined range at an angle within a predetermined range.

Generally, the number of kinds of commodities which are sold in a supermarket is great, and their shapes and sizes, and locations of bar code displaying areas are different from each other. Therefore, the operator must take much care to pass the bar code mounted on the commodity within the predetermined scanning region, and to keep the inclination of the bar code displaying area with respect to the laser beam in the predetermined angle ranges. The following situation however, frequently occurs; in which the scanner cannot exactly read the bar code on the commodity with only one passing of the commodity in front of the window 16. In such a situation, the operator must repeat the passing motions of the commodity in front of the window 16 until the scanner can exactly read the bar code on the commodity. If the scanner cannot exactly read the bar code on the commodity after such repeated passing motions of the commodity, the operator 25 must finally use the keyboard 20 on the support post 14 to enter the predetermined commodity data about the commodity to a cash register a Point Of Sales terminal with which the bar code reader is connected.

Such repeating works makes the operator get physical and mental fatigue, and further increases a wait by the purchaser. The increased wait results in reduction of the number of customers that can be handled per unit time in the store. This leads to reduction of sales.

SUMMARY OF THE INVENTION

Accordingly, an object of the present invention is to provide a commodity data reading apparatus of the above described type, which can surely increase the possibility that the scanner can exactly read the bar code on the commodity by only a one time passing of the commodity in front of the support post in which the scanner of the bar code reader is housed, and which can reduce the attentiveness required while the operator holds the commodity and passes it in front of the support post, thereby reducing the operator's physical and mental fatigue and reducing a wait by the purchaser.

In order to achieve the above described object of the present invention, a commodity data reading apparatus according to the invention comprises: a commodity receiving base having a commodity placing surface; a support post projecting upwardly relative to a commodity placing surface of the receiving base and a bar code reader having a plurality of scanners arranged at different positions on the support post.

In the commodity data reading apparatus according to the invention and characterized by being constructed as described above, the scanners of the bar code reader arranged at different positions on the support post enlarge a scanning area of the bar code reader, and broadens a tolerable angle range of the inclination of the bar code displaying area on the outer surface of the commodity with respect to the laser beam direction within the scanning area.

BRIEF DESCRIPTION OF THE DRAWINGS

FIG. 7 is a schematic block diagram of a priority decision circuit used in the bar code reader of FIG. 4 to decide which one of two commodity data read from one bar code on one commodity by the two scanners must be dealt with prior to the other one;

FIG. 8 shows a timing chart for explaining the operation of the priority decision circuit of FIG. 7;

FIGS. 11 and 12 are side views schematically showing first and second modifications of the commodity data reading apparatus of FIG. 4.

DETAILED DESCRIPTION OF THE PREFERRED EMBODIMENTS

Figure 1:
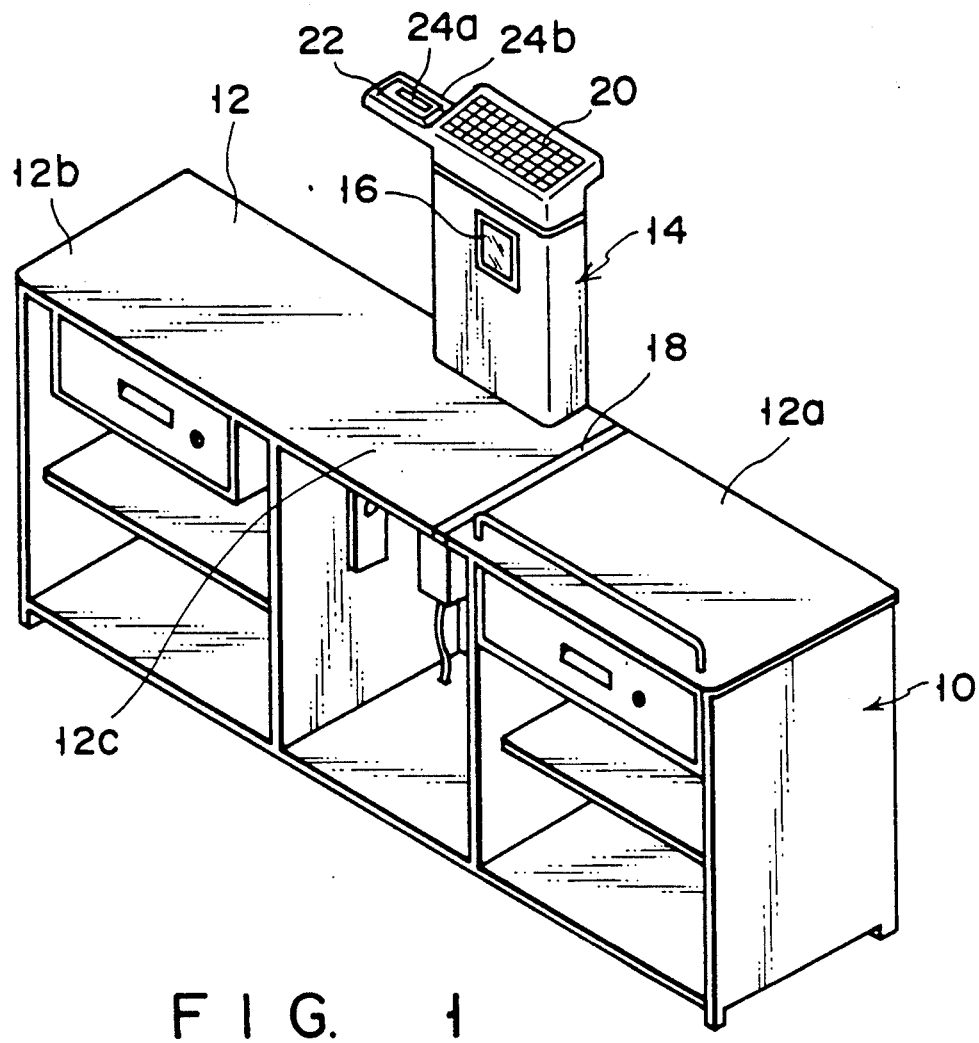
FIG. 1 is a perspective view schematically showing a conventional commodity data reading apparatus with a scanner support post, which is used in a supermarket.
Figure 2:
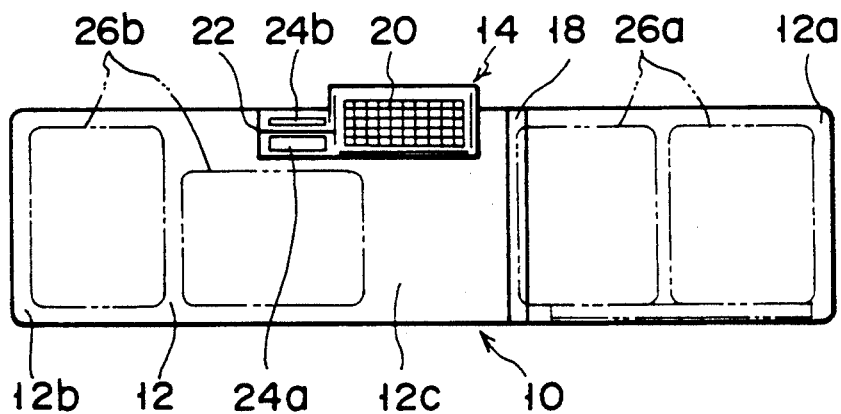
FIG. 2 is a plan view schematically showing the commodity data reading apparatus of FIG. 1.
Figure 3:
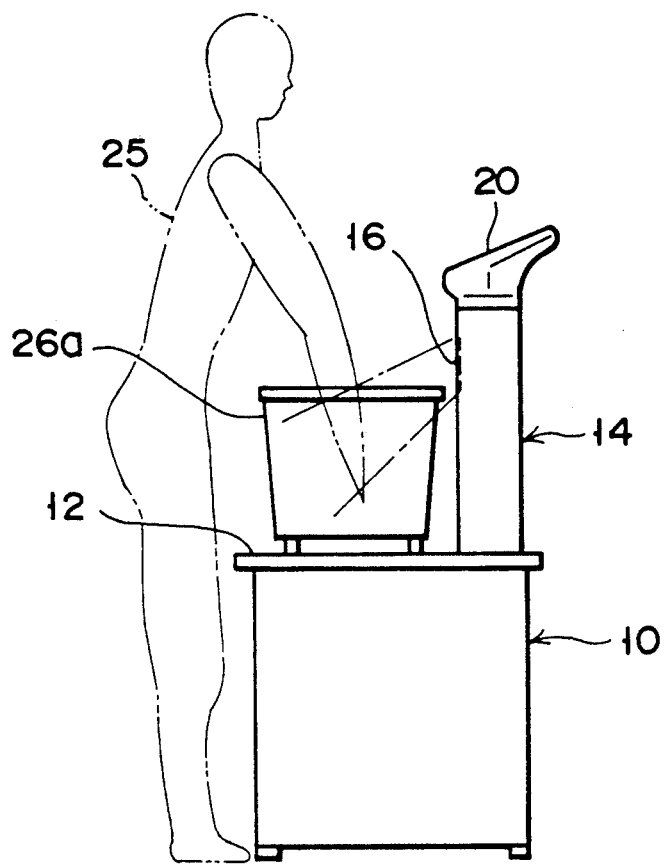
FIG. 3 is a side view schematically showing the commodity data reading apparatus of FIG. 1, wherein an operator is also schematically shown.
Figure 4:
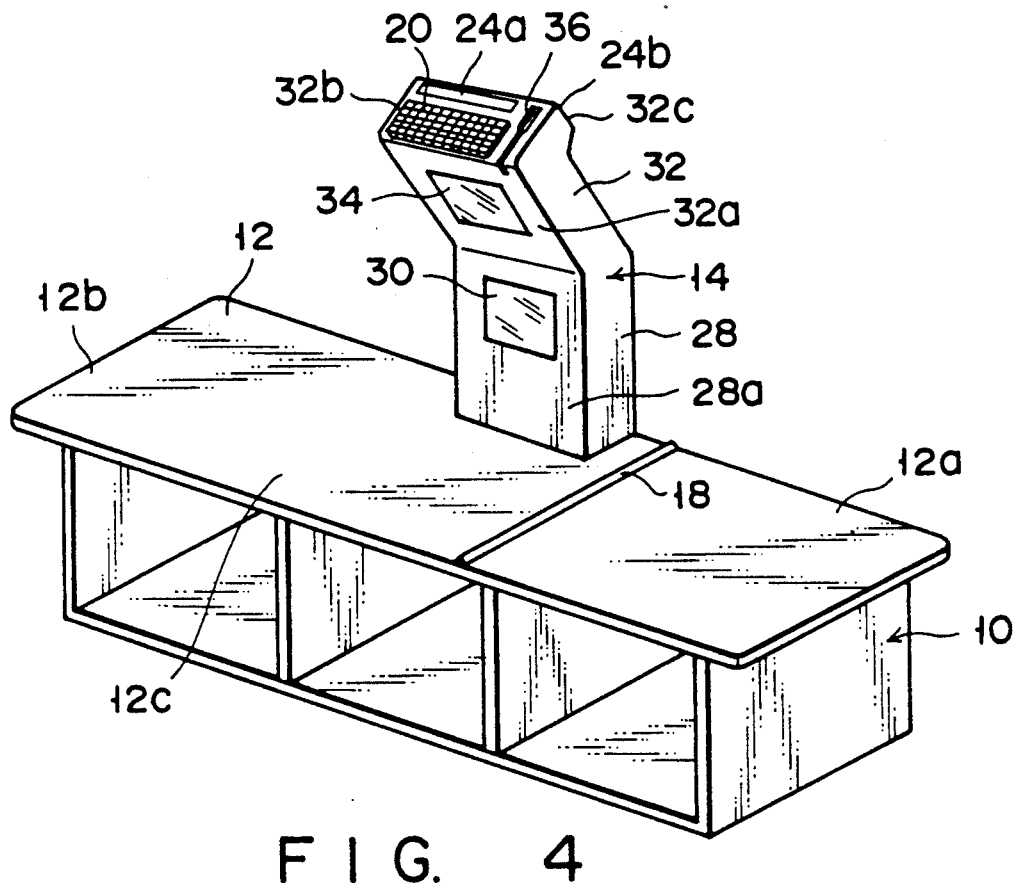
FIG. 4 is a perspective view schematically showing a commodity data reading apparatus according to an embodiment of the present invention.
Figure 5:
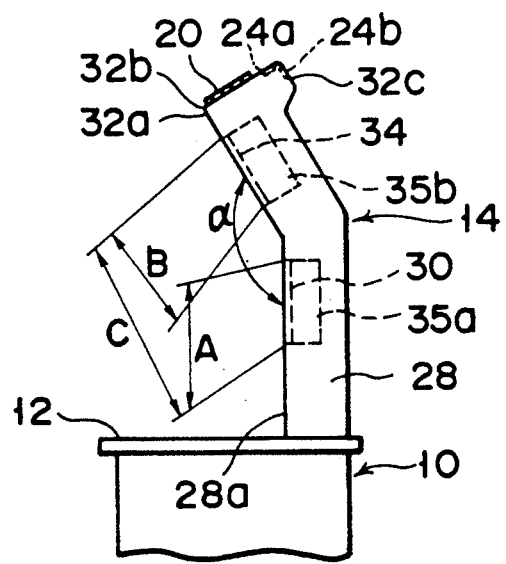
FIG. 5 is a side view schematically showing the commodity data reading apparatus of FIG. 4.

FIGS. 4 and 5 schematically show a commodity data reading apparatus according to an embodiment of the present invention. In those figures, like reference numerals are used for designating like or equivalent portions in FIGS. 1 through 3 illustrating the conventional commodity data reading apparatus already mentioned.

The structure of a check table 10 as a commodity receiving base of this embodiment is substantially the same as that of the above described conventional apparatus. This embodiment is, however, different from the above described conventional apparatus in the structure of the support post 14 and the construction of the bar code reader.

The post 14, which is rectangular in cross section, vertically upwardly projects from a substantial center of one side edge portion of the placing surface 12 of the check table 10, and then bends at a predetermined angle α to extend straightly over the placing surface 2.

A first bar code read window 30 is formed in the upper end portion of the front surface 28a (a portion of the circumferential surface located near the placing surface 12) of the vertically extending portion 28 of the post 14. A second bar code read window 34 is formed in the central portion of the front surface 32a of the upper side bend portion 32. A scanner 35a is disposed in the vertical extending portion 28 to face the first window 30. Another scanner 35b is disposed in the bend portion 32 to face the second window 34. These scanners 35a and 35b respectively emit laser beams for reading a bar code on a commodity, through the first and second windows 30 and 34 to the space outside the support post 14. Scanning ranges by the laser beams emitted from the scanners 35a and 35b are indicated by reference marks A and B. As shown in FIG. 5, these scanning ranges A, B partially overlap with each other. More exactly, the lower part of the scanning range B overlaps with the upper part of the scanning range A, so that a scanning range C by the bar code reader is substantially equal to the sum of the scanning ranges A and B by the scanners 35a and 35b. The scanners 35a and 35b emit the laser beams to cross each other in the outside of the support post 14.

A keyboard 20 and a card insertion slit 36 are provided on the projected end surface 32b of the support post 14. A card reader (not shown) is provided inside the slit 36. When a recording card such as magnetic card that is owned by an operator is inserted into the slit 36, the card reader reads a predetermined data from the card and enter the data into a Point Of Sales (POS) terminal such as a cash register connected with the bar code reader.

A display panel 24a for an operator is arranged on the projected end surface 32b to extend along the upper edge thereof. Another display panel 24b for a customer is arranged on the rear surface 32c (a portion of the circumferential surface located far away from the placing surface 12) of the bend portion 32 of the post 14 to extend along the upper edge thereof.

Figure 6:
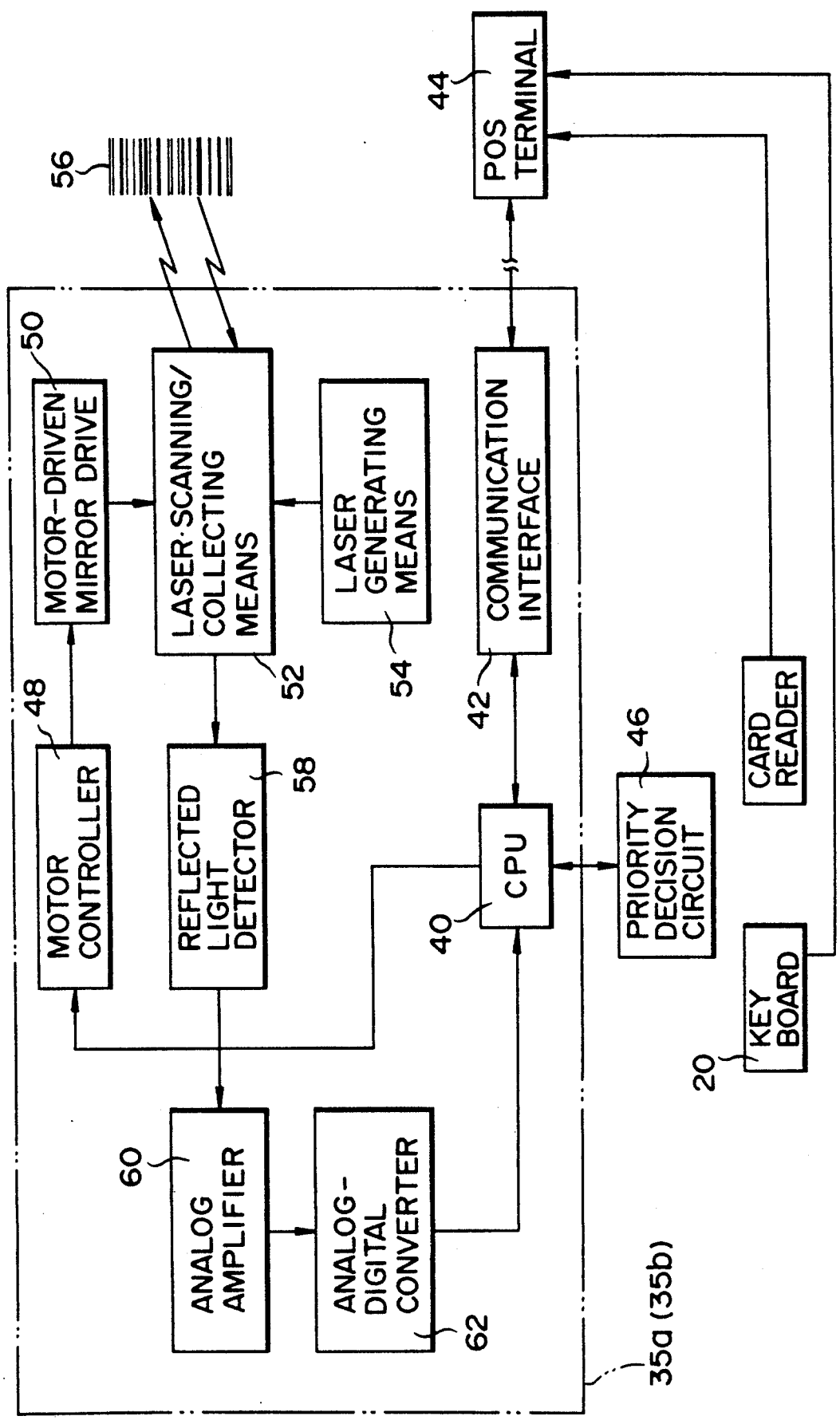
FIG. 6 is a schematic block diagram of a bar code reader of the commodity data reading apparatus of FIG. 4.

FIG. 6 schematically shows the construction of the bar code reader with the two scanners 35a and 35b. Each of the scanners 35a and 35b has CPU 40. Since the two scanners 35a, 35b have the same construction, only the construction of one scanner 35a is shown in FIG. 6. A CPU 40 is connected through a communication interface 42 with a Point Of Sales terminal 44 such as a cash register. The keyboard 20 and the card reader mounted in the card insertion slit 36 are also connected with the POS terminal 44, such as a cash register. Commodity data read from a bar code on the commodity by the scanners 35a and 35b, and the data inputted by the keyboard 20 or the card reader are sent to the POS terminal 44. The POS terminal processes the inputted data in a predetermined manner, and a signal from the POS terminal 44 is transferred to the CPU 40.

Further, a priority decision circuit 46 is connected with the CPU 40. The circuit 46 is used to decide which one of the same two commodity data, read from one bar code on one commodity by the two scanners 35a and 35b in the overlapping region of the two scanning ranges A and B, must be processed prior to another commodity data.

In the representative scanner 35a, a motor controller 48, a motor-driven mirror drive 50, and a laser scanning/collecting means 52 are connected to the CPU 40 in this order. A laser generating means 54 applies a laser beam to the scanning/collecting means 52. The means 52 scans a bar code 56 on a commodity with the laser beam. A laser beam reflected from the bar code is received by the means 52, and is detected by a reflected light detector 58. The detector 58 converts the reflected light signal corresponding to the scanned bar code into a corresponding electric signal, and transmits its electric signal through an analog amplifier 60 and an analog-digital (A/D) converter 62 to the CPU 40.

As shown in FIGS. 6 and 7, the priority decision circuit 46 is connected at its two request signal terminals REQT1 and REQT2, and at its time acknowledge signal terminals ACKT1 and ACKT2 with the CPU 40 of each of the two scanners 35a and 35b. The two request signal terminals REQT1 and REQT2 are further connected through an OR gate 64 to a timer 66. The timer 66 is connected with the circuit 46 to supply an enable signal EN to the circuit 46.

The operation of the priority decision circuit 46 is based on the fact that when the two scanners 35a and 35b read one bar code on one commodity within the overlapping region of the two scanning areas A and B, the timings of the data readings by the two scanners 35a and 35b will never be coincident with each other. In the case where the upper scanner 35b which is connected to one request signal terminal REQT2 reads one bar code on one commodity earlier than the lower scanner 35a which is connected to the other request signal terminal REQT1, one request signal REQ2 will reach the priority decision circuit 46 earlier and the OR gate 64 than the other request signal REQ1, as shown in FIG. 8.

By entering the request signal REQ2 into the OR gate 64, the timer 66 stops the sending of the enable signal EN to the priority decision circuit 46, for a predetermined period of time T2. Then, the circuit 46 only sends out an acknowledge signal ACK2 corresponding to the earlier inputted request signal REQ2, but does not produce an acknowledge signal ACK1 corresponding to the later inputted request signal REQ1. In this way, the commodity data earlier read from one bar code on the commodity by the scanner 35b is allowed to be transmitted from the CPU 40 of the scanner 35b to the POS terminal 44.

After the timer 66 is set, if either of the request signals REQ1 and REQ2 is applied to the priority decision circuit 46, the acknowledge signal ACK1 or ACK2 corresponding to the later applied request signal REQ1 or REQ2 is not send out from the circuit 46. Therefore, the signal corresponding to one bar code will never be inputted two times to the POS terminal 44. Consequently, the commodity data relating to one commodity will never be inputted two times to the POS terminal 44.

Figure 9:
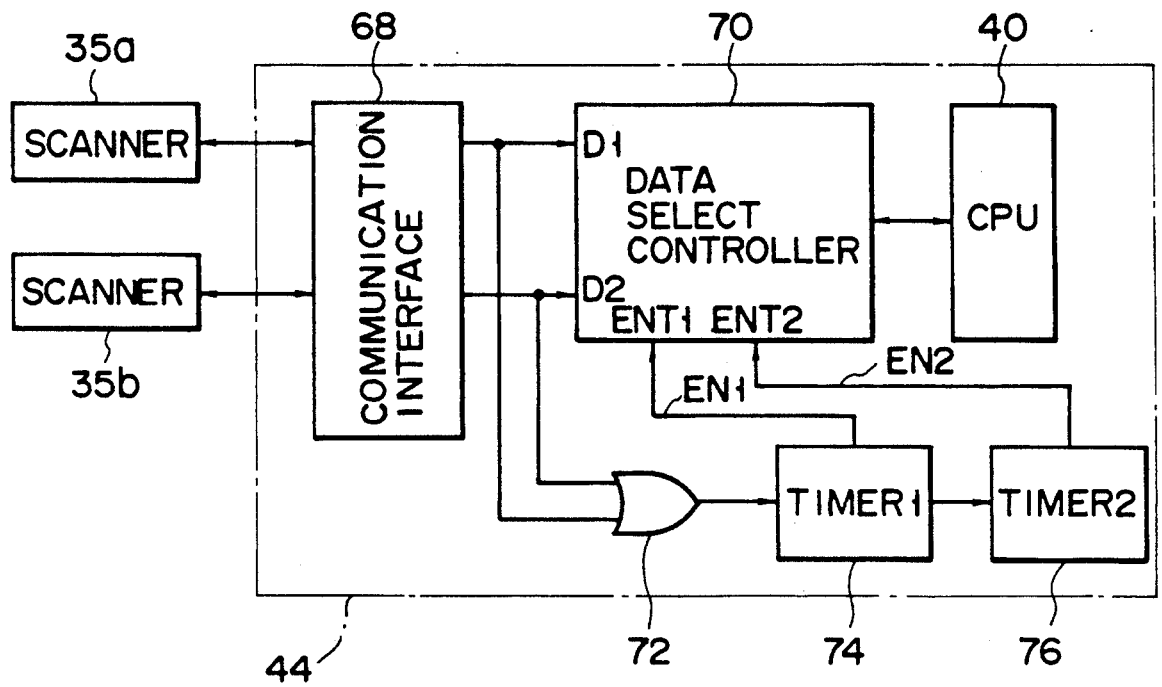
FIG. 9 is a schematic block diagram of another circuit used, instead of the priority circuit, for the bar code reader of FIG. 4 to process two commodity data read from one bar code on one commodity by the two scanners.

FIG. 9 schematically shows another circuit used, instead of the priority decision circuit 46 in the commodity data reading apparatus of FIG. 4. The circuit of FIG. 9 is mounted in the POS terminal 44 to process two commodity data read from one bar code on one commodity by the two scanners 35a and 35b.

In this circuit, the scanners 35a and 35b are connected with a CPU 71 of the POS terminal 44, through a communication interface 68 and a data select controller 70. The output of the communication interface 68 is connected to an OR gate 72 whose output is connected to two timers 74 and 76 that are connected in series. These timers 74 and 76 are connected to the enable terminals EN1 and EN2 of the data select controller 70.

In the above described circuit when either of the scanners 35a and 35b sends out a signal corresponding to one bar code on one commodity, the bar code corresponding signal is inputted to the CPU 71 during a period of time T1 that the timer 74 operates.

Figure 10:
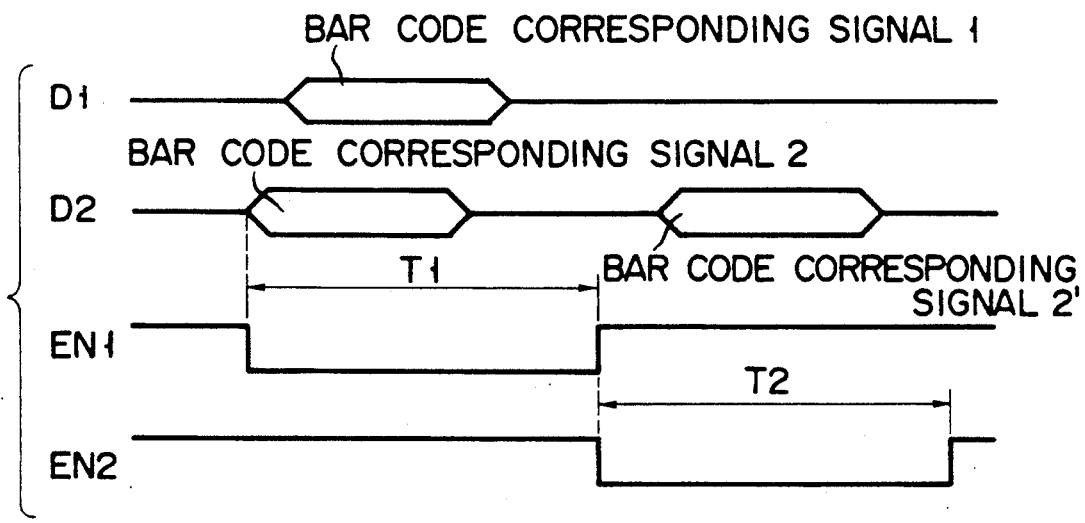
FIG. 10 shows a timing chart for explaining the operation of another circuit of FIG. 9.

During the period of time T1, when two bar code corresponding signals, read from one bar code on one commodity by the two scanners 35a and 35b, are inputted to the data select controller 70, as shown in FIG. 10, the controller 70 compares those two signals. If those two signals are equal to each other, only one of those two signals is inputted to the CPU 71. If they ar not equal, neither of them is inputted to the CPU 71.

Following the termination of the operating period T1 of the first timer 74, the second timer 76 starts to operate. Neither of the bar code corresponding signals, inputted to the data select controller 70 during the period of time T2 that the second timer 76 operates, will be sent out to the CPU 71. In this way, a signal corresponding to one bar code will never be transmitted two times to the POS terminal 44.

It should be understood that the above described embodiment of the present invention is used for illustrative purposes only, and the present invention may variously be modified and changed within the spirit and scope of the invention.

For example, the support post 14 may be gently curved so that its projected end portion overhangs the placing surface 12 of the check table 10, as is shown in FIG. 11.

Further, the support post 14 may be a vertically straight shape, as is shown in FIG. 12. In this case, however, two scanners 35a and 35b must be arranged at two vertically separated positions on the straight support post 14 so that two laser beam emitted directions from the two scanners 35a, 35b cross each other and two scanning regions A and B are partially overlapped with each other, as shown.

Either of the above described two modifications relating to the support post 14 can provide the same technical advantages as those provided in the above describe commodity data reading apparatus according to one embodiment of this invention.

What is claimed is:

1. A commodity data reading apparatus comprising:
a commodity receiving base having a placing surface;
a support post projecting upwardly relative to the placing surface of said commodity receiving base;
a bar code reader having a plurality of scanners arranged at a plurality of vertical positions different from each other on said support post;
said support post having a first portion projecting upwardly from said placing surface of said receiving base, and having a further portion which extends upwardly from said first portion so as to be inclined relative to said first portion and to extend over said placing surface of said receiving base; and
said plurality of scanners of said bar code reader are arranged at at least two different vertical positions on said support post, such that a lower scanner is mounted to said first portion of said support post, and an upper scanner is mounted to said further portion of said support post, each of said plurality of scanners of said bar code reader having a pointing direction and a scanning area in which the scanning area partially overlaps with a scanning area, of at least another one of the scanners, and the pointing direction intersects with a pointing direction of said at least another one of the scanners.

2. The commodity data reading apparatus according to claim 1, wherein said plurality of scanners of said bar code reader are arranged at vertically separated positions on said support post.

3. The commodity data reading apparatus according to claim 1, wherein said plurality of scanners of said bar code reader emit laser beams in different directions.

4. The commodity data reading apparatus according to claim 1, wherein said bar code reader further includes an input means, in addition to said scanners, and wherein said input means is arranged on said support post.

5. The commodity data reading apparatus according to claim 4, wherein said input means includes a manually operable input device, and is arranged on a projected end portion of said support post.

6. The commodity data reading apparatus according to claim 4, wherein said bar code reader further includes data display means for displaying at least a part of data entered into said bar bode reader, and said data display means is arranged on said support post.

7. The commodity data reading apparatus according to claim 6, wherein said data display means is arranged on a projected end portion of said support post.

8. The commodity data reading apparatus according to claim 7, wherein said data display means includes two data display panels, one of which is arranged on said projected end portion of said support post.

9. The commodity data reading apparatus according to claim 7, wherein said input means includes a manually operable input device, and is arranged on said projected end portion of said support post.

10. The commodity data reading apparatus according to claim 1, wherein said bar code reader further includes data display means for displaying at least a part of data entered into said bar bode reader, and said data display means is arranged on said support post.

11. The commodity data reading apparatus according to claim 10, wherein said data display means is arranged on a projected end portion of said support post.

12. The commodity data reading apparatus according to claim 11, wherein said data display means includes two data display panels, one of which is arranged on said projected end portion of said support post.

13. The commodity data reading apparatus according to claim 1, wherein:

said first portion of said support post projects vertically in a direction substantially at a right angle from said placing surface of said receiving base, and said further portion extends upwardly from said first portion at an angle to said vertical direction; and said lower scanner looks substantially in a horizontal direction relative to the placing surface of said receiving base, and said upper scanner looks in a direction which intersects the placing surface of said receiving base.

* * * * *